Figure 1:
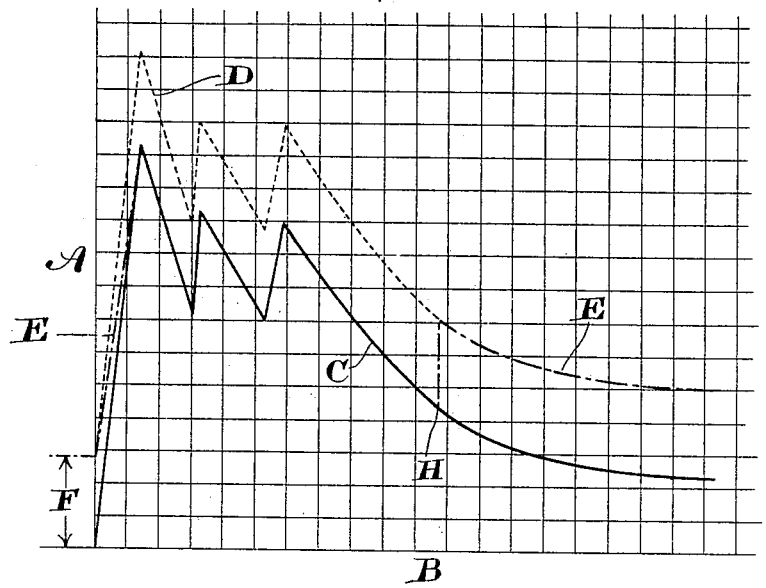

(No Model.)

M. T. A. KUBIERSCHKY.
ELECTRIC RAILWAY.

No. 598,731. Patented Feb. 8, 1898.

WITNESSES:
A. H. Abell.
A. J. Macdonald.

INVENTOR.
M. T. A. Kubierschky
By his Attorney

UNITED STATES PATENT OFFICE.

MARTIN T. A. KUBIERSCHKY, OF BERLIN, GERMANY, ASSIGNOR TO THE GENERAL ELECTRIC COMPANY, OF NEW YORK.

ELECTRIC RAILWAY.

SPECIFICATION forming part of Letters Patent No. 598,731, dated February 8, 1898.

Application filed March 26, 1897. Renewed January 10, 1898. Serial No. 666,246. (No model.) Patented in Germany January 1, 1896, No. 91,764; in Belgium November 28, 1896, No. 124,856, and in France November 28, 1896, No. 261,697.

*To all whom it may concern:*

Be it known that I, MARTIN T. A. KUBIERSCHKY, a subject of the King of Prussia, residing at Berlin, in the Kingdom of Prussia, Germany, have invented certain new and useful Improvements in Electric Railways, (Case No. 399,) (for which the following patents have been issued: German patent, No. 91,764, dated January 1, 1896; Belgian patent, No. 124,856, dated November 28, 1896, and French patent, No. 261,697, dated November 28, 1896,) of which the following is a specification.

The present invention relates to electric railways in which electric heaters or accumulators are employed on the cars; and it has for its object to so arrange the consumption of power in the system that a power-station which is of sufficient capacity to furnish power to the cars when no electric heaters or accumulators are used can, by suitable controlling devices carried by the cars, be made to supply the power for both cars and heaters or accumulators without overloading the machines at the station.

In starting a car, especially on a grade, a large amount of energy is required, and where a large number of cars are supplied with power from a generator or number of generators they have to be of sufficient capacity to furnish the excess of current required for all the cars at the moment of starting. This is especially noticeable where the circuit-breakers of the system have blown and the cars start up together, when the circuit is again closed. If in addition to the current necessary to propel the cars there are heaters requiring, for example, seven amperes of current per car, which is a fair average, it will readily be seen that there will be a large increase in the current consumption of the system. Although not necessarily of long duration, this requires that the station shall be of sufficient capacity to carry the overload. To overcome the objections above pointed out, I arrange the heaters or accumulators in such a manner that they may be included in circuit at the time the motor or motors are cut out, corresponding to the "off" position of the controller. Then as the current is supplied to the motors for starting the heaters are cut out of circuit and remain so until the motors have gained a certain amount of speed and the current consumption has decreased, when the heaters are included in circuit again by means of the controller. The particular point at which the circuit is established depends upon the number of steps in the controller.

Figure 2:
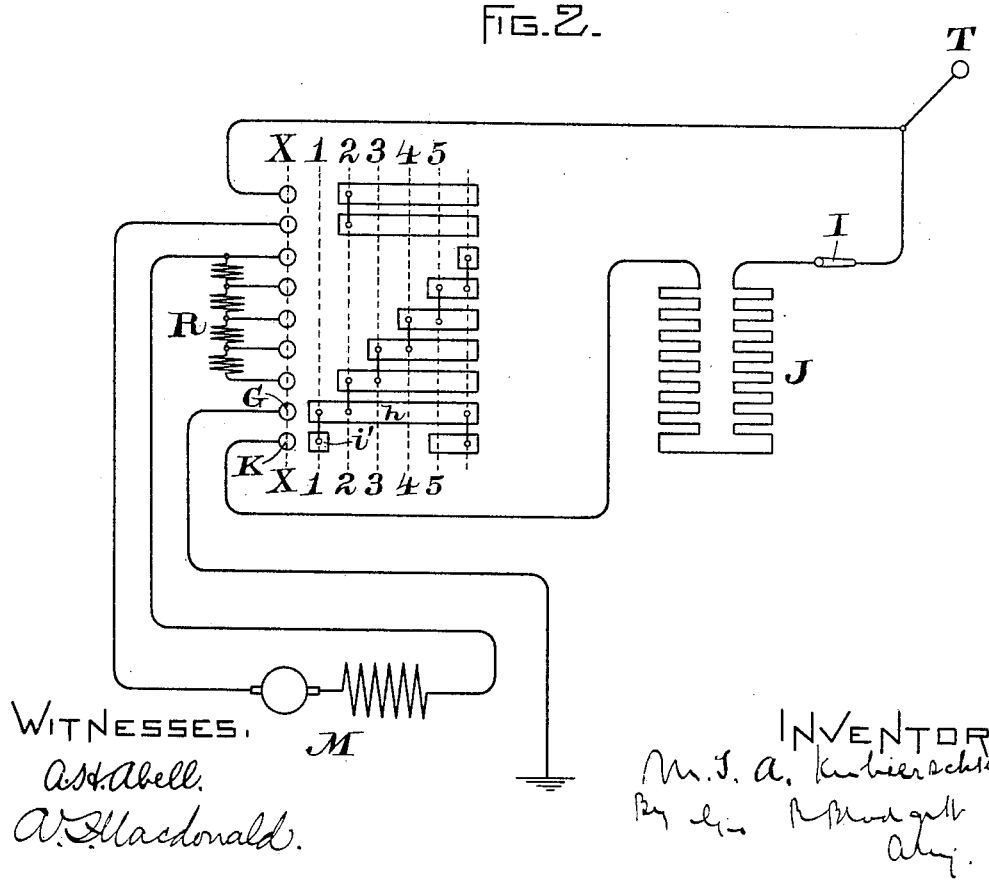

In the accompanying drawings, attached to and made a part of this specification, Figure 1 is a diagram illustrating the power consumption of a car or number of cars, and Fig. 2 is a diagrammatic view of a controller for accomplishing the desired result.

The vertical line A measures the watts consumed in the system, and the horizontal line B the intervals of time.

The curve C (shown by full lines) represents the energy consumed by the motors. It rises rapidly at the start and fluctuates up and down as the circuit relations of the motor or motors are varied, the extreme right-hand end of the curve representing the power consumed after the car has attained normal speed.

The dotted line D indicates the consumption of energy of the car when the heaters or accumulators, as well as the motors, are in circuit, the main curve now rising much higher than before and fluctuating up and down until the right-hand end of the curve is reached, which indicates the energy consumed by the motors and heaters under normal running conditions.

The broken and dotted line E indicates the energy consumed when the motors and heaters are regulated according to the present invention.

The energy represented by F is the amount consumed by the heaters when the motors are out of circuit. The motors are now included in circuit with the heaters cut out, and the current rises and fluctuates in a manner indicated by the curve C until the point H is reached, when the heaters are included in circuit and the current rises, and from here the current follows the same curve as before.

The difference in the amount of energy consumed at the time of starting is indicated by the difference between the highest point in the curve C and the corresponding one in the curve D. The output of the station has to be sufficient to supply energy to the amount indicated by the curve C and not the curve D, as is the case with other systems with which I am familiar.

Fig. 2 shows a development of a suitable controller-cylinder, of which any desired type may be used. The brushes on the line X X are stationary, and the contacts on the cylinder are arranged to engage therewith. Assuming that the cylinder has rotated until the brushes rest on the line 1 1, then with the switch I closed the circuit is as follows: trolley T, switch I, heater or accumulator J, brush K, contact $i'$, by cross connection to contact $h$, to brush G, to ground. With the circuits arranged as above the heater J is included in the trolley-circuit and the motor is open-circuited. The next movement of the cylinder with respect to the brushes cuts out the heater J, and the circuit from the trolley is completed through the resistance R and motor M to ground. A continued rotation of the cylinder cuts out the resistance R step by step until the line 5 5 is reached, corresponding to the point H of Fig. 1. At this point the heater J is again included in circuit by reason of the brush K completing the circuit through the contacts $i^2$ and $h$ to brush G to ground. The next step cuts out the remaining section of resistance by reason of the contact $c$ engaging with its brush. The motor M and heater J are now included in circuit, and the amount of energy consumed is indicated by the right-hand end E of the curve.

The curves outlined in Fig. 1 may represent the total output of a station or the energy consumed by a single car.

What I claim as new, and desire to secure by Letters Patent of the United States, is—

1. In an electric railway, the combination of a motor or motors for propelling a vehicle, electric heaters carried thereon, a controller for the motor, and contacts on the controller-cylinder for including the heaters in circuit at certain predetermined intervals.

2. In an electric railway, the combination of a motor for propelling a vehicle, electric heaters, a controller, and contacts on the controller-cylinder for including the heaters in circuit with the source of power when the motor is idle, means for interrupting this circuit and establishing the motor-circuit, and contacts for reëstablishing the heater-circuit after certain changes of the motor-circuit have been made.

3. In an electric-railway system, the combination of a motor for propelling the car, electric heaters, a controller-cylinder provided with contacts for regulating the energy supplied to the motor, contacts on the cylinder for including a heater in circuit at the time the motor-circuit is interrupted, contacts for reëstablishing the heater-circuit after the controller-cylinder has been moved to a high-speed position, and a cut-out switch for the heater.

4. In an electric railway, the combination of a motor for propelling the car, electric heaters, a controller for regulating the motor and heaters, contacts for establishing the heater-circuit, means for breaking the heater-circuit and establishing the motor-circuit, and means for reëstablishing the heater-circuit after the controller has established the high-speed circuit relations of the motor.

5. The combination of one or more electric motors for propelling a car, electric heaters, and a controller having contacts for closing the motor-circuit with the heater-circuit open, and subsequently closing the heater-circuit after the motors have attained speed.

In witness whereof I have hereunto set my hand this 17th day of September, 1896.

MARTIN T. A. KUBIERSCHKY.

Witnesses:
MAX HAMBURGER,
PAUL HERKNE.